United States Patent
Yuen et al.

(10) Patent No.: US 9,148,594 B2
(45) Date of Patent: Sep. 29, 2015

(54) FIXED PATTERN NOISE REMOVAL METHOD

(71) Applicant: NOVATEK Microelectronics Corp., Hsin-Chu (TW)

(72) Inventors: Yi-Wen Yuen, Hsinchu (TW); Wei Hsu, Taoyuan County (TW); Chao-Yu Meng, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 148 days.

(21) Appl. No.: 13/952,664

(22) Filed: Jul. 28, 2013

(65) Prior Publication Data

US 2014/0313378 A1   Oct. 23, 2014

(30) Foreign Application Priority Data

Apr. 18, 2013   (TW) .............................. 102113824 A

(51) Int. Cl.
*H04N 5/217* (2011.01)
*H04N 5/365* (2011.01)
*H04N 9/04* (2006.01)

(52) U.S. Cl.
CPC ............. *H04N 5/365* (2013.01); *H04N 5/3658* (2013.01); *H04N 9/045* (2013.01)

(58) Field of Classification Search
CPC ......................................... H04N 5/365–5/3658
USPC .......................................................... 348/241
See application file for complete search history.

(56) References Cited

U.S. PATENT DOCUMENTS

| | | | |
|---|---|---|---|
| 2009/0021611 A1* | 1/2009 | Utsugi | .......................... 348/241 |
| 2010/0182452 A1 | 7/2010 | Utsugi | |
| 2012/0075505 A1 | 3/2012 | Van Beek | |

* cited by examiner

*Primary Examiner* — Sinh Tran
*Assistant Examiner* — Mark Monk
(74) *Attorney, Agent, or Firm* — Winston Hsu; Scott Margo

(57) ABSTRACT

A fixed pattern noise removal method for an image sensor includes steps of calculating each compensation value corresponding to each pixel column according to a plurality of compensation pixel values of the each pixel column; and sampling a plurality of active pixel values in an active pixel area and compensating the plurality of active pixel values according to the each compensation value of the each pixel column, to generate a plurality of compensated active pixel values. A plurality of active pixels sense light to generate the plurality of active pixel values.

9 Claims, 9 Drawing Sheets

FIXED PATTERN NOISE REMOVAL METHOD

BACKGROUND OF THE INVENTION

1. Field of the Invention

The present invention relates to a fixed pattern noise removal method, and more particularly, to a fixed pattern noise removal method in an image sensor which only needs to calculate each compensation value corresponding to each pixel column for compensation, so as to save memory usage and reduce computation complexity.

2. Description of the Prior Art

Generally for an image sensor, the pixels used for image sensing are not uniform in dimension, spacing, and efficiency. Also, a row sampler such as the correlation double sampling (CDS) sampling active pixel values row by row may result in deviations. That is, a specific sampler is used for a specific column pixel, and thus if samplers in a row are not uniformly designed or fabricated, sampled pixel values of pixel columns may have deviation, which causes noise in vertical lines of the image due to the sampling non-uniformity. Thus, the image captured by the image sensor may have a non-random fixed pattern noise (FPN) induced by the drawback of the hardware architecture.

For example, please refer to FIG. 1A and FIG. 1B, which illustrate schematic diagrams of a real image IMG and a noise image NIMG with a column fixed pattern noise, respectively. As shown in FIG. 1A and FIG. 1B, since the specific sampler is used for a specific column pixel, and samplers in a row are not uniformly designed and fabricated, the sampled pixel values of the pixel columns have fixed pattern noises in vertical lines of the image (the vertical stripes as shown in FIG. 1B) due to the sampler non-uniformity.

In such a situation, a conventional technology takes a real picture and an optical black picture separately under the same condition, and then subtracts the optical black picture from the real picture to remove the fixed pattern noise. However, this method requires the image sensor to record and store the whole optical black picture for different parameter control (e.g., temperature, gain value, exposure time), which consumes a huge memory. Thus, there is a need for improvement of the prior art.

SUMMARY OF THE INVENTION

It is therefore an objective of the present invention to provide a fixed pattern noise (FPN) removal method for an image sensor to compensate the pixel values by only calculating a corresponding compensation value of each column pixel, so as to save the memory space and reduce the computation complexity.

The present invention discloses a fixed pattern noise (FPN) removal method for an image sensor. The FPN removal method includes calculating each compensation value corresponding to each pixel column according to a plurality of compensation pixel values of each pixel column; and sampling a plurality of active pixel values in an active pixel area and compensating the plurality of active pixel values according to the each compensation value of each pixel column, to generate a plurality of compensated active pixel values; wherein a plurality of active pixels sense light to generate the plurality of active pixel values.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
FIG. 1A and FIG. 1B are schematic diagrams of a real image and a noise image with a column fixed pattern noise, respectively.
Figure 1B:
Figure 2:
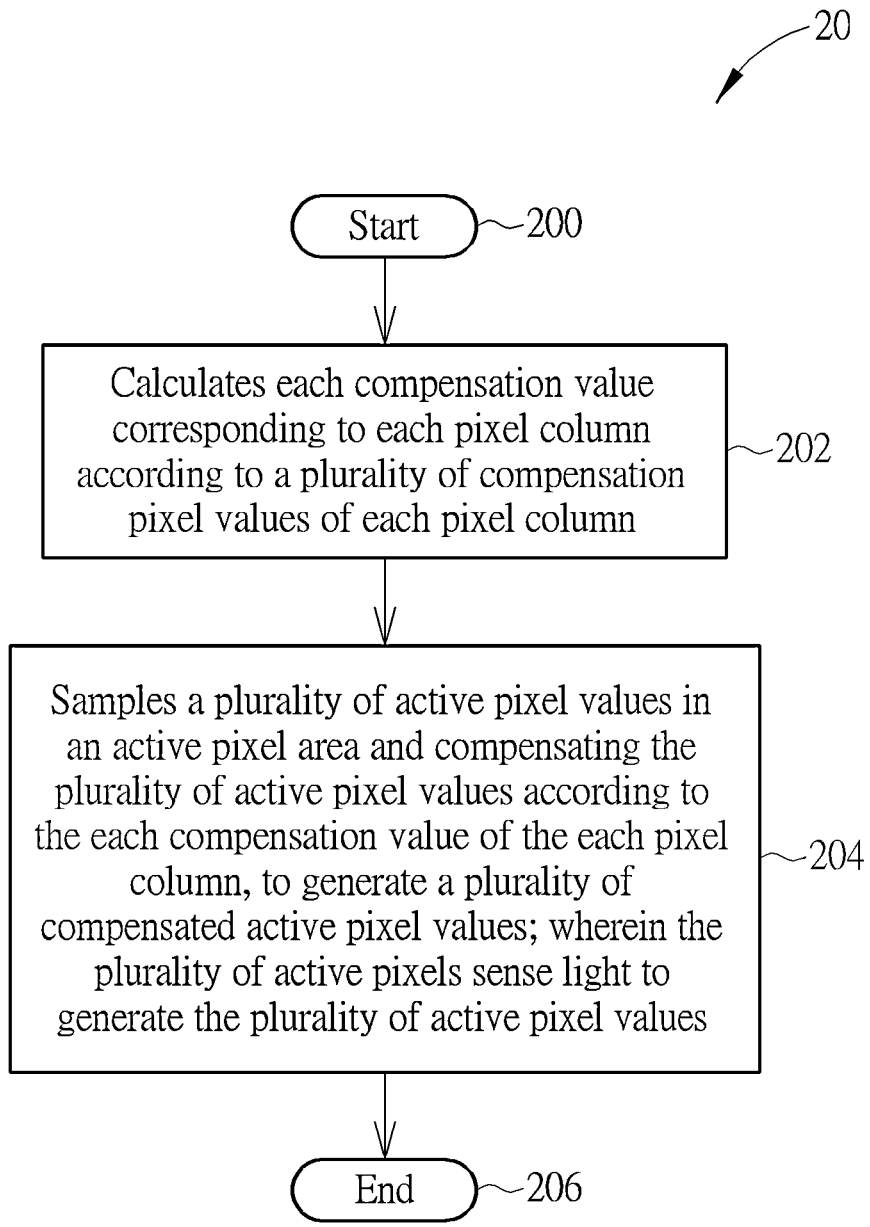
FIG. 2 is a flowchart of a fixed pattern noise removal process according to an embodiment of the present invention.

Please refer to FIG. 2, which is a flowchart of a fixed pattern noise (FPN) removal process 20 according to an embodiment of the present invention. As shown in FIG. 2, the fixed pattern removal process 20 is used in an image sensor, and includes the following steps:

Step 200: Start.

Step 202: Calculates each compensation value corresponding to each pixel column according to a plurality of compensation pixel values of each pixel column.

Step 204: Samples a plurality of active pixel values in an active pixel area and compensating the plurality of active pixel values according to the each compensation value of the each pixel column, to generate a plurality of compensated active pixel values; wherein the plurality of active pixels sense light to generate the plurality of active pixel values.

Step 206: End.

According to the fixed pattern removal process 20, the present invention calculates each compensation value corresponding to each pixel column according to a plurality of compensation pixel values of each pixel column. Then, the present invention samples a plurality of active pixel values in an active pixel area and compensates the plurality of active pixel values according to the each compensation value of the each pixel column, to generate a plurality of compensated active pixel values. In such a condition, the present invention only requires storing the corresponding compensation values of each column pixel of all pixel columns in the memory or even does not need to store the corresponding compensation values. Therefore, compared with the conventional technique that requires storing the entire optical black picture, the present invention may significantly save the memory space. As a result, the present invention only needs to calculate the corresponding compensation values of the pixel columns to compensate, and thereby saves the memory space and reduces the computation complexity of the fixed pattern noise removal.

Figure 3:
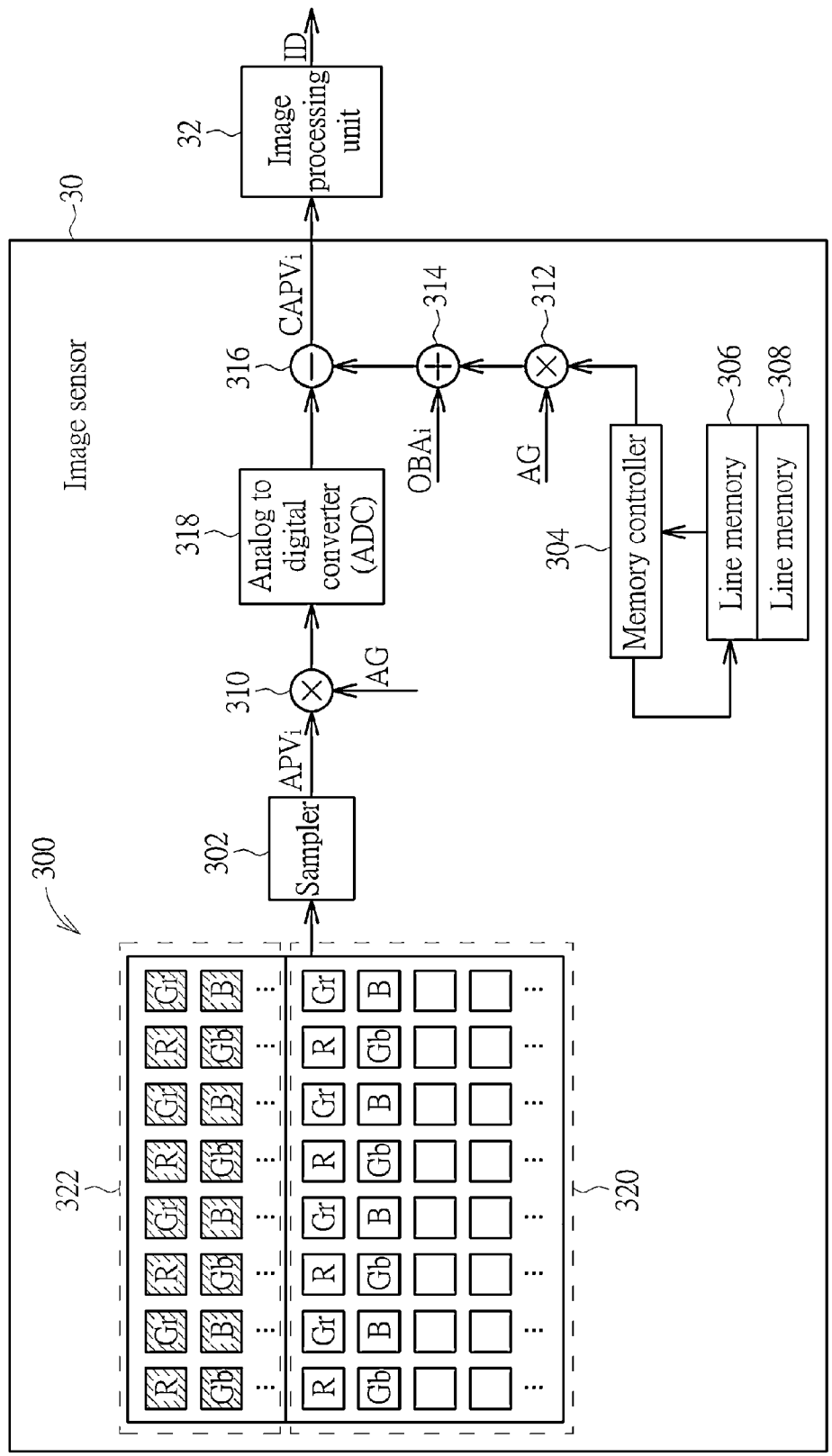
FIG. 3 is a schematic diagram of an image sensor according to an embodiment of the present invention.

For example, please refer to FIG. 3, which illustrates a schematic diagram of an image sensor 30 according to an embodiment of the present invention. The image sensor 30 generates an active pixel value $CAPV_i$ for an image processing unit 32 to generate an image data ID. The image sensor 30 includes a pixel matrix 300, a sampler 302, a memory controller 304, line memories 306, 308, multipliers 310, 312, an adder 314, a subtractor 316, and an analog to digital converter (ADC) 318. The pixel matrix 300 includes an active pixel area 320 and an optical black area 322, and the pixel matrix 300 is with a Bayer pattern structure so that each pixel is one of three primary colors, such as a red pixel R, green pixels Gr, Gb, and a blue pixel B, to sense a specific color.

In short, under an initial state, the image sensor 30 may set the ISO to a specific operational gain such that the sampler 302 may sample under the specific operational gain and then calculate the differences, $LM_{306(c)j}$, $LM_{308(c)k}$, between each primary color pixel column average sum $(CP_{(c)j})/CPN_{(c)j}$ sum $(CP_{(c)k})/CPN_{(c)k}$ of each primary color in each pixel column in the optical black area 322 and each primary color pixel average $AVE_j$, $AVE_k$ of each primary color in the optical black area 322. The difference between the average pixel value of specific primary color pixels in a specific pixel column and the average pixel value of all specific primary color pixels is the fixed pattern noise. Then, the memory controller 304 stores the values into the line memories 306, 308. (The pixels in the optical black area 322 do not sense light. In this embodiment, 16 lines are used for averaging the values, and the pixel values of each primary color pixel in each pixel column of the optical black area 322 correspond to the plurality of compensation pixel values mentioned in the step 202.) The above operations can be expressed as follows:

$$LM_{306(c)j} = AVE_j - \text{sum}(CP_{(c)j})/CPN_{(c)j}, AVE_j = \text{sum}(OBP_j)/OBPN_j, j = R, Gr$$

$$LM_{308(c)k} = AVE_k - \text{sum}(CP_{(c)k})/CPN_{(c)k}, AVE_k = \text{sum}(OBP_k)/OBPN_k, k = Gb, B$$

where sum $(CP_{(c)j})/CPN_{(c)j}$ and sum $(CP_{(c)k})/CPN_{(c)k}$ represent the average values derived from dividing the sum of pixel values for primary color pixels j, k in a pixel column by the amount of the primary color pixels k, and sum $(OBP_j)/OBPN_j$ and sum $(OBP_k)/OBPN_k$ represent the average value derived from dividing the sum of pixel values for the primary color pixels j, k in the optical black area 322 by the amount of the primary color pixels j, k.

For example, in the first column of the left-hand side, the Bayer pattern only has the red pixels R and the green pixels Gb. Therefore, when calculating the average value (sum $(CP_{(1)R})/CPN_{(1)R}$) of the red pixels R in the first column, the present invention sums up all the pixel values of the red pixels R in the first column and divides the sum by the amount of the red pixel R in the optical black area 322. Next, the present invention calculates the red pixel average value $AVE_R$ in the optical black area 322 by summing up all the pixel values of the red pixels R in the optical black area 322 and dividing the sum by the amount of the red pixels R. Afterward, the difference value $LM_{306(1)R}$ is derived by subtracting sum $(CP_{(1)R})/CPN_{(1)R}$ from $AVE_R$ and is saved in a position corresponding to the red pixel R in the first column. By the same token, difference values $LM_{306(c)j}$ $LM_{308(c)k}$ corresponding to the red pixel R, the green pixels Gr, Gb, and the blue pixel B in the other columns are calculated and stored in the line memories 306, 308, respectively. Since the pixel arrangement repeats in every other row in the Bayer pattern, only two line memories 306, 308 are required to store all the differences of the average values for the primary color pixels in all the columns. Besides, since the FPN is a fixed noise, the specific operational gain may be set to a maximum operational gain for a definite record.

Next, after the image sensor 30 sets the ISO to the specific operational gain in the initial state, and the memory controller 304 stores the difference values $LM_{306(c)j}$ $LM_{308(c)k}$ in the line memories 306, 308, in an active state, the sampler 302 samples the active area 320 to generate the active pixel value $APV_i$, and the image sensor 30 sets the ISO to an analog gain AG for the multiplier 310 to amplify the active pixel value $APV_i$ accordingly. Then, the analog-to-digital converter 318 converts the amplified active pixel value $APV_i$ to a digital format. In the mean time, the memory controller 304 reads the corresponding difference values $LM_{306(c)j}$ $LM_{308(c)k}$ from the line memories 306, 308 to multiply the difference values by a ratio of an analog gain AG over the specific operational gain in the initial state via the multiplier 312, so as to obtain the fixed pattern noise (FPN) under the analog gain AG. (Because the FPN is a fixed noise, it is assumed to be proportionally enlarged or reduced according to the gain of ISO). Then, the adder 314 sums up the primary color pixel value average $OBA_i$ (the optical black area 322 is not lighted, and thus the specific primary color pixel value average $OBA_i$ in the optical black area 322 represents the dark current level of the specific primary color pixel) in the optical black area 322 under the analog gain AG to obtain each compensation value for each pixel column. Finally, the subtractor 316 subtracts each corresponding compensation value of each pixel column from the active pixel value $APV_i$ to obtain the compensated active pixel value $CAPV_i$. The above operations can be expressed as follows:

$$OBA_i = \text{sum}(AGOBP_i)/AGOBPN_i$$

$$CAPV_i = APV_i - OBA_i + LM_{(c)i} \cdot AG$$

$$i = R, Gr, R, Gr; LM_{(c)i} = LM_{306(c)j}, LM_{308(c)k}$$

where sum $(AGOBP_j)/AGOBPN_j$ represents dividing the sum of pixel values of primary color pixel i in the optical black area 322 under the analog gain AG by the amount of primary color pixel i.

As a result, the image sensor 30 only needs to store the difference values $LM_{306(c)j}$ $LM_{308(c)k}$ in two line memories 306, 308 during the initial state, and then compensates and removes the fixed pattern noise via the simple combinations of the multiplier 312, the adder 314, and the subtractor 316 during the active state. Therefore, the computing complexity is reduced and the memory space is saved.

Figure 4:
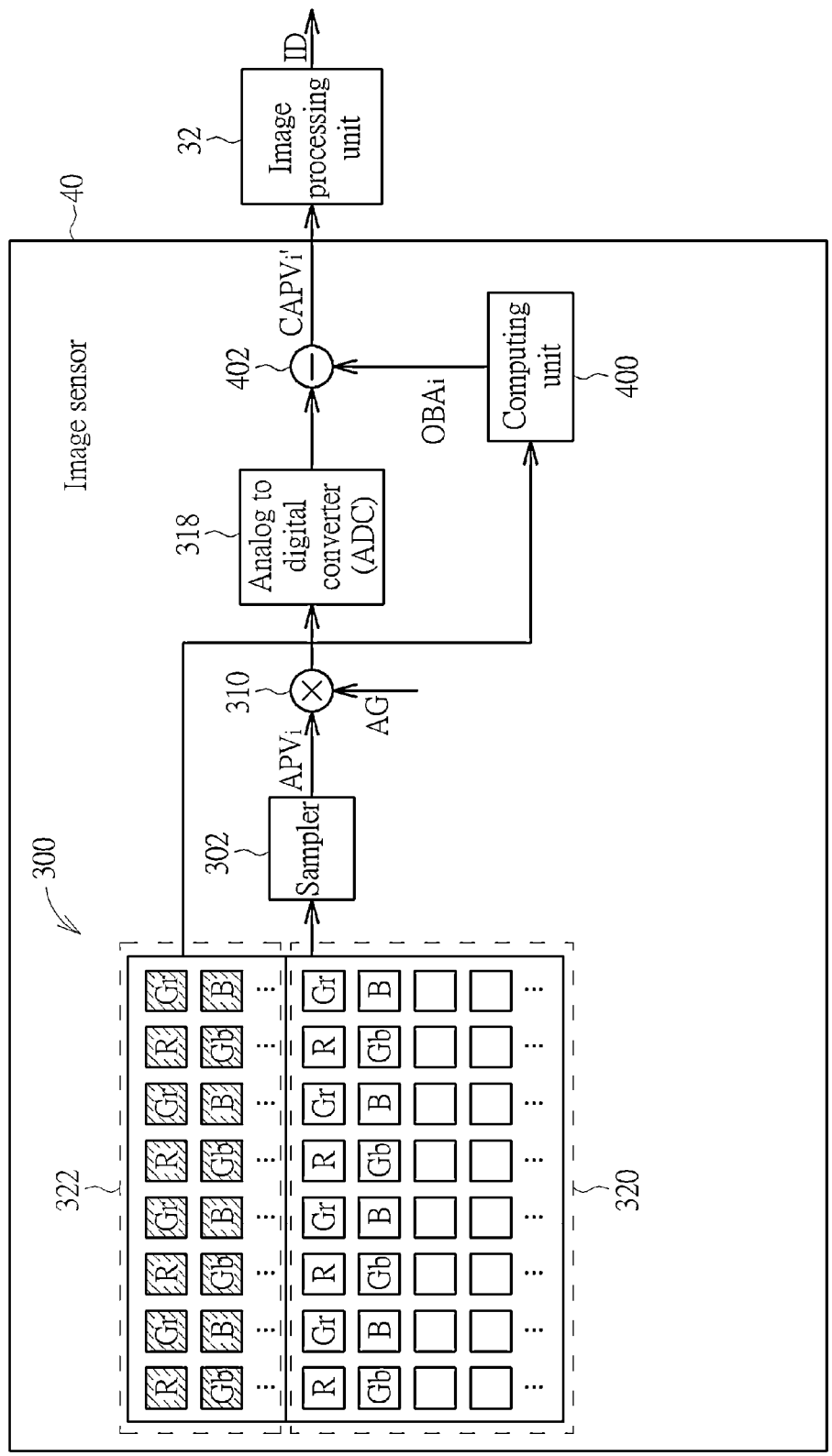
FIG. 4 is a schematic diagram of another image sensor according to an embodiment of the present invention.

Noticeably, the above embodiment calculates each compensation value for each pixel column for saving memory space and reducing the computing complexity. Those skilled in the art can make modifications or alterations accordingly. For example, please refer to FIG. 4, which illustrates a schematic diagram of another image sensor 40 according to an embodiment of the present invention. The image sensor 40 is similar with the image sensor 30, so components and signals with the same function are represented by the same symbols. The major differences between the image sensor 40 and the image sensor 30 are that the image sensor 40 does not store the difference values via the memories during the initial state. Instead, while the sampler 302 samples and generates the active pixel value $APV_i$ by sampling the active area during the active state that followed by an operation of the multiplier 310 and the analog-to-digital converter 318, the computing unit 400 samples and calculates each optical black column pixel average value $OBCA_i$ in the optical black area 322 for each pixel column as the compensation value of each pixel column (the column pixel average includes the dark current component and the fixed pattern noise component; each column pixel values of the each pixel column in the optical black area 322 correspond to the plurality of compensation values of each pixel column in the step 202). Then, a subtractor 402 subtracts each corresponding compensation value (i.e., the optical black column pixel average value $OBCA_i$) from the active pixel value $APV_i$ to obtain the compensated active pixel value $CAPV_i'$. The above operations can be expressed as follows:

$$OBCA_i = \text{sum}(OBCP_i)/OBCPN_i$$

$$CAPV_i' = APV_i - OBCA_i$$

$$i = R, Gr, R, Gr$$

where $(OBCP_j)/OBCPN_j$ represents dividing the sum of pixel values of the primary color pixel i in a specific column in the optical black area 322 under the analog gain AG by the amount of the primary color pixel i.

As a result, because the image sensor 40 directly samples and calculates each optical black column pixel average value $OBCA_i$ of each pixel column in the optical black area 322 as the compensation value, and then uses the subtractor 402 to compensate and remove the fixed pattern noise, the image sensor 40 does not require the memories but can still reduce the computation complexity.

Figure 5:
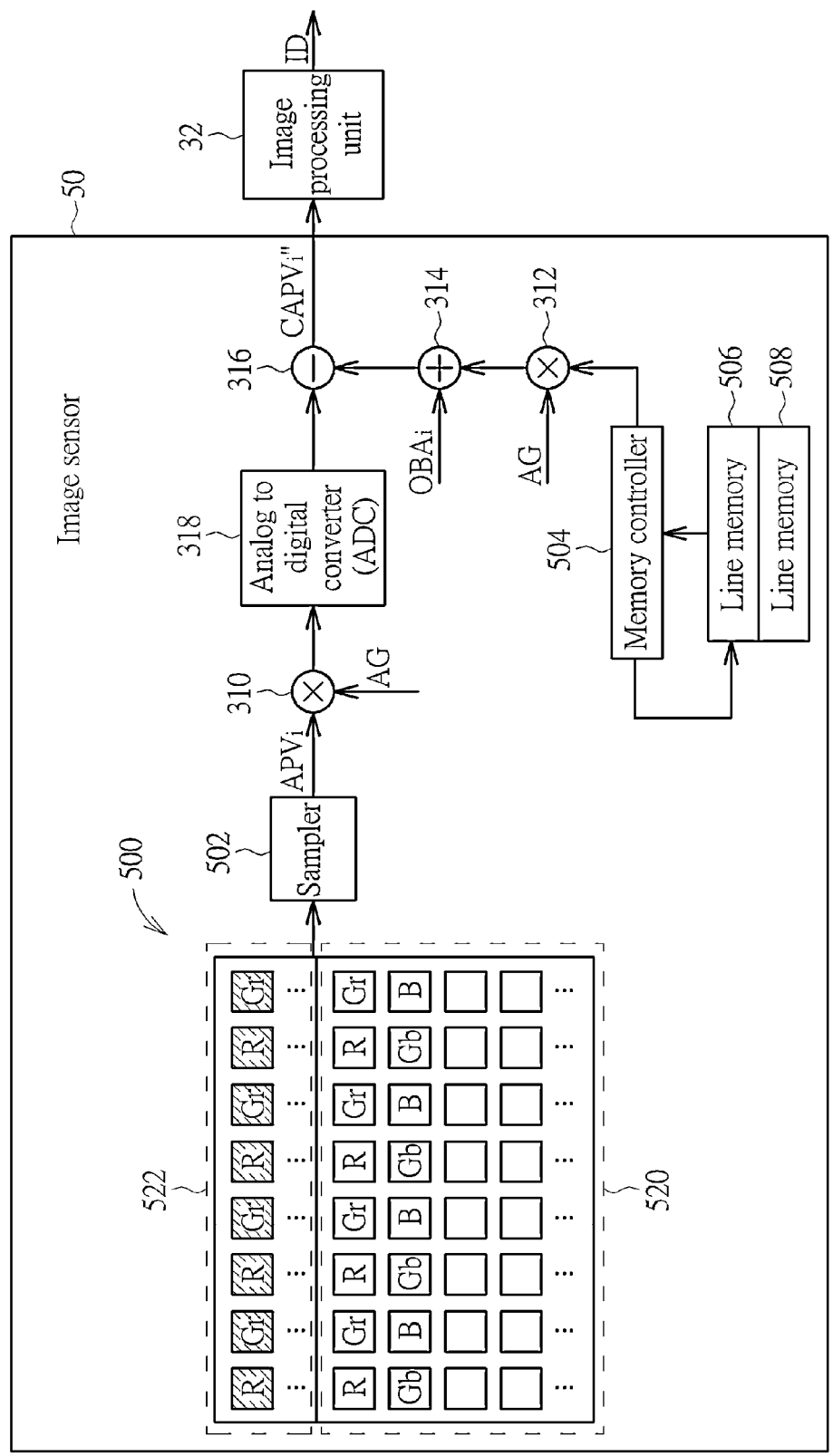
FIG. 5 is a schematic diagram of another image sensor according to an embodiment of the present invention.

Moreover, please refer to FIG. 5, which shows a schematic diagram of another image sensor 50 according to an embodiment of the present invention. The image sensor 50 is similar with the image sensor 30, so components and signals with the same function are represented by the same symbols. The major differences between the image sensor 50 and the image sensor 30 are that, after ISO is set to a specific operational gain in the initial state, the image sensor 50 cuts the connection between the sampler 502 and the pixels in the active area 520 of the pixel matrix 500 (since the connection is cut between the sampler 502 and the pixel matrix 500, the data sampled by the sampler is circuit values corresponding to the pixel matrix 500). Then, the image sensor 50 calculates the difference values $LM_{506(c)j}$, $LM_{508(c)k}$ between the column primary color circuit average sum $(CC_{(c)j})/CCN_{(c)j}$, sum $(CC_{(c)k})/CCN_{(c)k}$ of each primary color pixel in each pixel column of the sampler 502 corresponding to the active area 520 and the primary circuit value average $CAVE_j$, $CAVE_k$ of each primary color pixel of the sampler 502 that corresponds to the active area 520 (i.e., the difference value between the specific primary pixel circuit value average of a specific column and the primary color pixel circuit value average for all circuit values of a specific primary color is the fixed pattern noise caused by the sampler 502 that corresponds to a specific primary color pixel in a specific column). Then, a memory controller 504 stores the difference in the line memories 506, 508 (each primary color circuit value average of each pixel column in the active area 520 is the plurality of compensation value of each pixel column in the step 202). The above operations can be expressed as follows:

$$LM_{506(c)j} = CAVE_j - \text{sum}(CC_{(c)j})/CCN_{(c)j}$$

$$CAVE_j = \text{sum}(APC_j)/APCN_j, j = R, Gr$$

$$LM_{508(c)k} = CAVE_k - \text{sum } CC_{(c)k}/CCN_{(c)k}$$

$$CAVE_k = \text{sum}(APC_k)/APCN_k, k = R, Gr$$

where sum $(APC_j)/APCN_j$, sum $(APC_k)/APCN_k$ represent dividing the sum of the circuit values of primary color pixel j, k for the sampler 502 that corresponds to the active area 502 by the amount of the primary pixels j, k, respectively.

For example, in the first column of the left-hand side, the Bayer pattern only has the red pixel R and the green pixel Gb. Therefore, when the column red circuit average sum $(CC_{(1)R})$ $CCN_{(1)R}$ of the first column is calculated, the connection between the sampler 502 and the pixel column 500 may be cut first. Next, the sampler simulates the normal operation of the connection with the red pixel R in the first column of the active area 520 to obtain the corresponding circuit value, sums the values up, and divides the sum by the amount of the red pixel R in the first column. Then, the red circuit value average $CAVE_R$ of the red pixel R corresponding to the active area 520 is calculated, i.e., the sampler 502 simulates the normal operation of that connection with all the red pixels R in the active area 520 to obtain the corresponding circuit value to sum them up and divide the sum by the number of the red pixels R. After that, the sampler 502 subtracts the obtained column red circuit average sum $(CC_{(1)R})/CCN_{(1)R}$ from the red circuit value average $CAVE_R$ to derive the difference value $LM_{506(1)R}$ and store the value into the place that corresponds with the first column of the red pixel R. By the same token, difference values $LM_{506(c)j}$, $LM_{508(c)k}$ corresponding to the red pixel R, the green pixels Gr, Bg, and the blue pixel B in the other columns may be stored into the memories 506, 508, respectively. Since the pixel arrangement repeats in every other row in the Bayer pattern, only two line memories 506, 508 are required to store all the difference average for all columns' primary color pixels. Besides, because the FPN is a fixed noise, the specific operational gain may be set to a maximum operational gain for a definite record.

Next, after the image sensor 50 sets the ISO to the specific operational gain in the initial state, cuts the connection between the sampler 502 and the pixel matrix 500, and the memory controller 504 stores the difference values $LM_{506(c)j}$, $LM_{508(c)k}$ in the line memories 506, 508, the sampler 502 reconnects the pixel matrix 500 and samples the active area 520 to generate the active pixel value $APV_i$ in an active state of the image sensor 50. In addition, the image sensor 50 sets the ISO to an analog gain AG for the multiplier 310 to amplify the active pixel value $APV_i$. Then, the analog-to-digital converter 318 converts the amplified $APV_i$ to a digital format. In the mean time, the memory controller 504 reads the corresponding difference values $LM_{506(c)j}$, $LM_{508(c)k}$ from the line memories 506, 508, and difference values $LM_{506(c)j}$, $LM_{508(c)k}$ are multiplied via the multiplier 512 by a ratio of an analog gain AG over a specific operational gain in the initial state to obtain the fixed pattern noise (FPN) under the analog gain AG (i.e. Since the FPN is the fixed noise, the FPN is proportionally enlarged or reduced according to the gain). Then, an adder 314 is used to sum up the primary color pixel value average $OBA_i$ (the optical black area 322 is not lighted, so the specific primary color pixel value average $OBA_i$ represents the dark current level of the specific primary color pixel) in the optical black area 322 under the analog gain AG to obtain each compensation value for each pixel column. Finally, the subtractor 316 subtracts each corresponding compensation value of each pixel column from the active pixel value $APV_i$ to obtain the compensated active pixel value $CAPV_i$ for the active area. The above operations can be expressed as follows:

$$OBA_i = \text{sum}(AGOBP_i)/AGOBPN_i$$

$$CAPV_i'' = APV_i - OBA_i + LM_{(c)j} * AG$$

$$i = R, Gr, R, Gr; LM_{(c)i} = LM_{506(c)j}, LM_{508(c)k}$$

where sum $(AGOBP_j)/AGOBPN_j$ represents dividing the sum of pixel values of the primary color pixel i in the optical black area 322 under the analog gain AG by the amount of the primary color pixel i.

As a result, the image sensor 50 only needs to store the difference values $LM_{506(c)j}$, $LM_{508(c)k}$ in two line memories 506, 508 during the initial state, and then compensates and removes the fixed pattern noise via the simple combinations of the multiplier 312, the adder 314, and the subtractor 316 during the active state. Therefore, the computing complexity is reduced and the memory space is saved. Moreover, in the image sensor 50, the connection between the sampler 502 and the pixel matrix 500 is cut, and each pixel column compensation value is calculated by each primary color circuit average of each column pixel. Therefore, compared with the image sensor 30, the image sensor 50 may use smaller optical black area (i.e. the image sensor 50 does not require the optical black area 522 for averaging and calculating the compensation value, and thus only four columns are needed).

Figure 6:
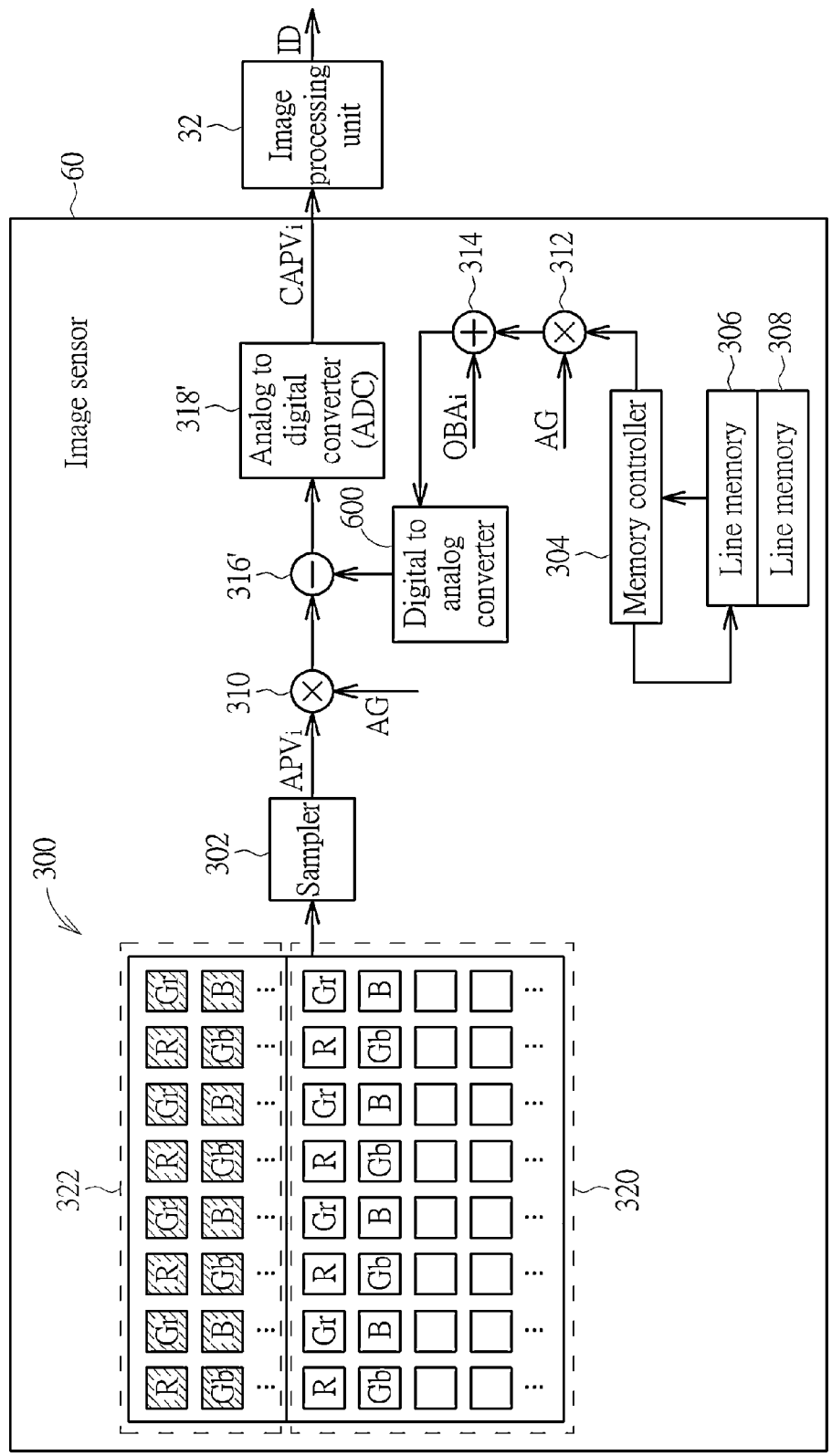
FIGS. 6 to 8 are schematic diagrams of other three image sensors according to embodiments of the present invention.
Figure 7:
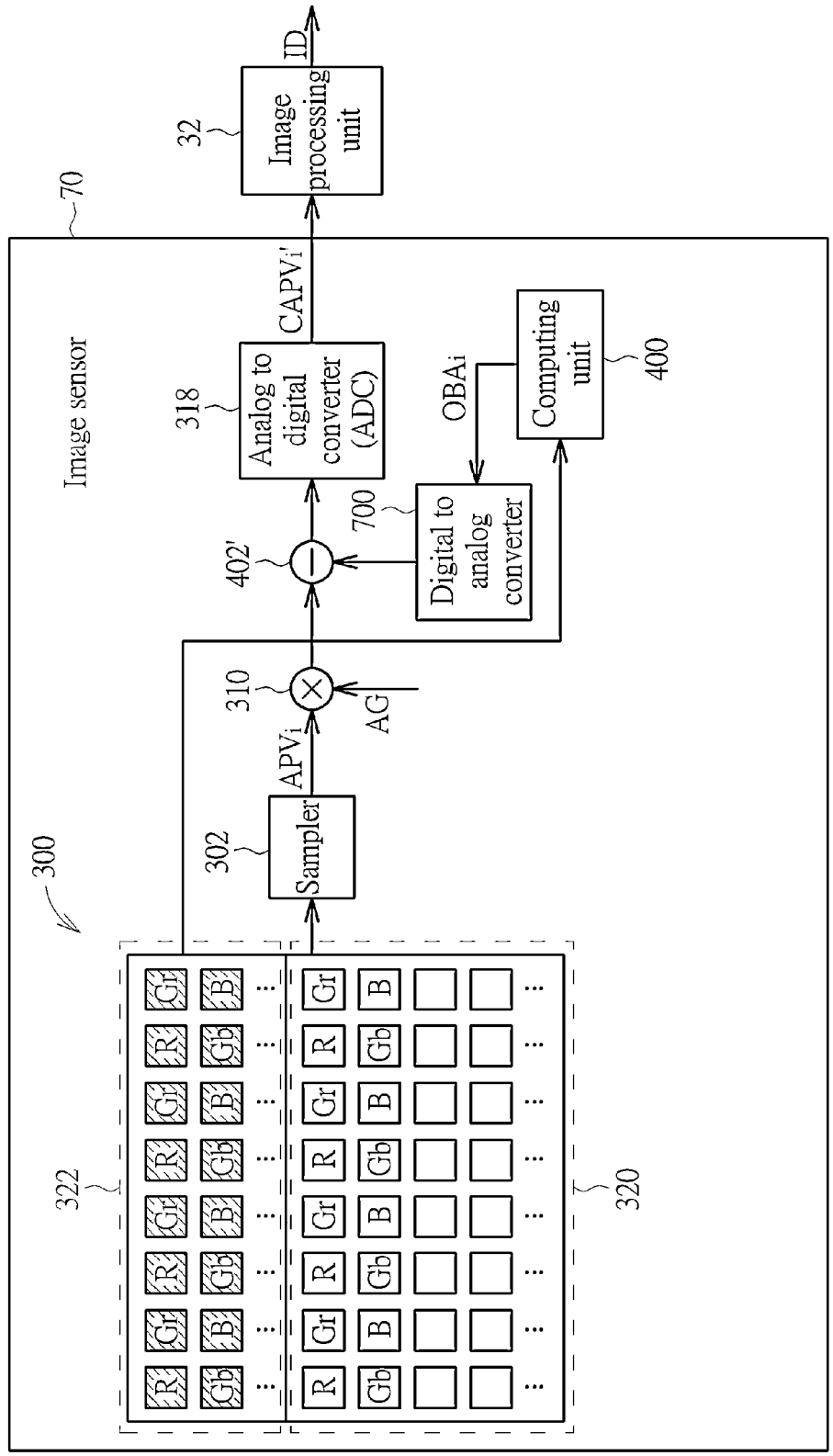
Figure 8:
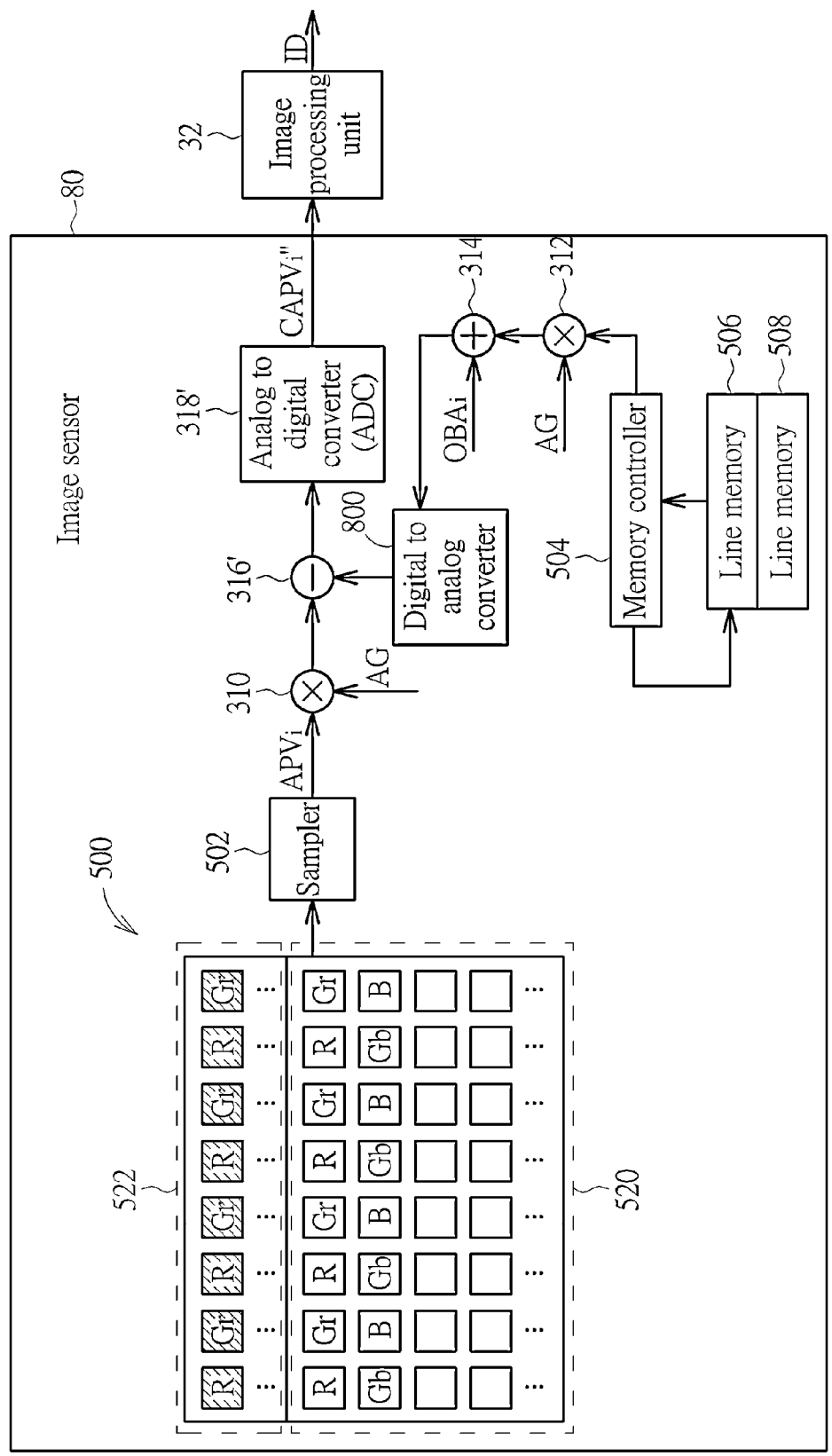

Besides, in the above embodiments, the image sensors 30, 40, and 50 compensate the active pixel value $APV_i$ with the compensation value in a digital manner (i.e., the compensation value is in a digital format, and the active pixel value $APV_i$ is converted to the digital format by an analog-to-digital converter 318 before processing the compensation). However, in other embodiments, the compensation may be performed in an analog manner to the compensation value and the active pixel value $APV_i$. Please refer to FIG. 6 to FIG. 8, which are schematic diagrams of image sensors 60, 70, and 80 according to other three embodiments of the present invention. The image sensors 60, 70, and 80 are similar with the image sensors 30, 40, and 50, so components and signals with the same function are represented by the same symbols. The major differences between the image sensors 60, 70, and 80 and the image sensors 30, 40, and 50 are that the image sensors 60, 70, and 80 convert the digital compensation value to the analog compensation value via digital to analog converters 600, 700, and 800, respectively, and then compensate the analog amplified active pixel value $APV_i$ through the subtractors 316', 402'. Afterward, the compensated active pixel value is converted to the digital format by an analog-to-digital converter 318'. Consequently, the image sensors 60, 70, and 80 may compensate the compensation value and the active pixel value $APV_i$ in the analog manner.

In the prior art, the image sensor needs to separately take a real picture and an optical black picture, and then subtracts the optical black picture form the real picture to remove the fixed pattern noise. However, using the conventional method requires to record and store the whole optical black for different parameter control (temperature, gain value, exposure time), which requires a huge memory.

In comparison, the present invention calculates the compensation value corresponding with each pixel column for compensation. Therefore, the present invention only needs to store each compensation value corresponding to each pixel column in the memory, or does not need to store the compensation value in the memory, which reduces the memory space as well as the computing complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixed pattern noise (FPN) removal method for an image sensor, comprising:
    calculating each compensation value corresponding to each pixel column according to a plurality of compensation pixel values of the each pixel column; and
    sampling a plurality of active pixel values in an active pixel area and compensating the plurality of active pixel values according to the each compensation value of the each pixel column, to generate a plurality of compensated active pixel values;
    wherein a plurality of active pixels sense light to generate the plurality of active pixel values;
    wherein the step of calculating each compensation value corresponding to each pixel column according to the plurality of compensation pixel values of the each pixel column comprises:
        setting a specific operational gain; and
        sampling and calculating a difference between each primary color pixel column average of pixels of each primary color in the each pixel column in an optical black area and each primary color pixel average of pixels of the each primary color in the optical black area under the specific operational gain and an initial state, and saving the difference to a memory;
    wherein all pixels in the optical black area do not sense light.

2. The FPN removal method of claim 1, wherein the step of calculating the each compensation value corresponding to the each pixel column according to the plurality of compensation pixel values of the each pixel column comprises:
    calculating each optical black area specific primary color pixel average of pixels of all specific primary colors in the optical black area under an analog gain; and
    multiplying the difference between the each primary color pixel column average of the pixels of the each primary color in the each pixel column in an optical black area and the each primary color pixel average of the pixels of the each primary color in the optical black area by a ratio of the analog gain to the specific operational gain, and then summing up the each optical black area specific primary color pixel average as the each compensation value of the each pixel column.

3. The FPN removal method of claim 1, wherein the specific operational gain is a maximum operational gain.

4. The FPN removal method of claim 1, wherein the step of calculating the each compensation value corresponding to the each pixel column according to the plurality of compensation pixel values of the each pixel column comprises:
    sampling and calculating each optical black area pixel column average of the each pixel column in an optical black area as the each compensation value of the each pixel column when the plurality of active pixels in the active pixel area sense light.

5. The FPN removal method of claim 1, wherein the step of calculating the each compensation value corresponding to the each pixel column according to the plurality of compensation pixel values of the each pixel column comprises:
    cutting off connections between a sampler and the plurality of active pixels in the active pixel area;
    and calculating a difference between each primary color circuit column average of pixels of each primary color in the each pixel column in the active pixel area corresponding to the sampler and each primary color circuit average of pixels of the each primary color in the active pixel area corresponding to the sampler under the specific operational gain and an initial state, and saving the difference to a memory.

6. The FPN removal method of claim 1, wherein the step of calculating the each compensation value corresponding to the each pixel column according to the plurality of compensation pixel values of the each pixel column comprises:
    calculating an optical black area pixel average of all pixels in an optical area; and
    multiplying the difference between the each primary color circuit average of the pixels of the each primary color in the active pixel area corresponding to the sampler and the each primary color circuit column average of the pixels of the each primary color in the each pixel column in the active pixel area corresponding to the sampler by a ratio of an analog gain to the specific operational gain, and then summing up the optical black area pixel average as the each compensation value of the each pixel column;

wherein all pixels in the optical black area do not sense light.

7. The FPN removal method of claim 5, wherein the specific operational gain is a maximum operational gain.

8. The FPN removal method of claim 1, wherein the each compensation value and the plurality of active pixel values are compensated in a digital form.

9. The FPN removal method of claim 1, wherein the each compensation value and the plurality of active pixel values are compensated in an analog form.

* * * * *